United States Patent [19]
Converse et al.

[11] 3,789,892
[45] Feb. 5, 1974

[54] TEMPLATE FOR USE IN THE ROUTING OF WORKPIECES

[75] Inventors: Gordon L. Converse, Elk Rapids; Merle C. Mihulka, Boyne City, both of Mich.

[73] Assignee: Twin Bay Industries, Inc., Elk Rapids, Mich.

[22] Filed: Apr. 15, 1971

[21] Appl. No.: 134,278

[52] U.S. Cl. ............. 144/144.5, 144/27, 33/197, 408/103
[51] Int. Cl. .................. B27c 5/10, B23q 35/44
[58] Field of Search ............ 144/144.5, 27; 33/197

[56] References Cited
UNITED STATES PATENTS

| | | | |
|---|---|---|---|
| 3,450,001 | 6/1969 | Fortune | 144/144.5 |
| 2,659,159 | 11/1953 | Jarrett et al. | 144/27 X |
| 2,348,406 | 5/1944 | Ogren | 144/27 |
| 3,221,784 | 12/1965 | Skollerud | 144/144.5 |
| 3,559,704 | 2/1971 | Thompson | 144/144.5 |

*Primary Examiner*—Donald R. Schran
*Attorney, Agent, or Firm*—Learman & McCulloch

[57] ABSTRACT

A routing template comprises a body adapted to overlie a workpiece to be routed and having an opening formed in the body for the accommodation of a routing tool. Atop the body is carried a plate having a predetermined thickness and having an opening therein of an area corresponding to the area of the workpiece to be routed, the area of the opening in the plate being no greater than that of the opening in the body and communicating with the latter. The plate may be replaced by any one of a number of other plates of different thickness and having openings of different sizes so as to vary the depth and area of the cut made in a workpiece. The body is provided with means for clamping and unclamping the body to the workpiece to be routed.

7 Claims, 9 Drawing Figures

PATENTED FEB 5 1974

INVENTORS
GORDON L. CONVERSE
MERLE C. MIHULKA

BY
*Learman + McCulloch*

ATTORNEYS

INVENTORS
GORDON L. CONVERSE
MERLE C. MIHULKA

BY

ATTORNEYS

TEMPLATE FOR USE IN THE ROUTING OF WORKPIECES

The invention disclosed herein relates to a template especially adapted for mounting on a workpiece to be routed so as to enable the routing of a workpiece to a predetermined depth and shape. The template is particularly adapted for the routing of hinge pockets and other recesses in doors and door jambs, but the template is not limited to such use.

A conventional routing tool has a motor driven, rotary cutter which extends beyond a plate or shroud carried by the tool so as to gouge or rout a recess in a workpiece. When using such a tool, the depth of the recess depends upon the distance the rotary cutter projects beyond the plate or shroud and the area of the recess formed by the cutter depends in large part upon the skill of the operator. An adjustment of the cutter to vary the depth of cut requires considerable skill and frequently requires several fine adjustments, all of which consumes time. Moreover, the area of a recess routed in a workpiece without the use of a template may require several measurements to be taken, which also is a time consuming process. Should a recess be formed having an area greater than that required, an entire workpiece may be spoiled.

An object of this invention is to provide a routing template which enables the depth to which a recess is formed in a workpiece to be determined quickly and precisely without adjustment of the router's cutting tool.

Another object of the invention is to provide a template which enables the area of the recess to be routed to be determined precisely.

A further object of the invention is to provide a routing template provided with self-contained means for clamping and unclamping the template to the workpiece to be routed.

Another object of the invention is to provide a template of the character referred to having routing guides which may be substituted one for another so as to vary the size of a recess to be formed in a workpiece.

Another object of the invention is to provide a routing template having a routing guide which may be secured in any one of a number of different positions so as to enable the specific location of a recess in a workpiece to be varied.

Other objects and advantages of the invention will be pointed out specifically or will become apparent from the following description when it is considered in conjunction with the appended claims and the accompanying drawings, in which:

Figure 1:
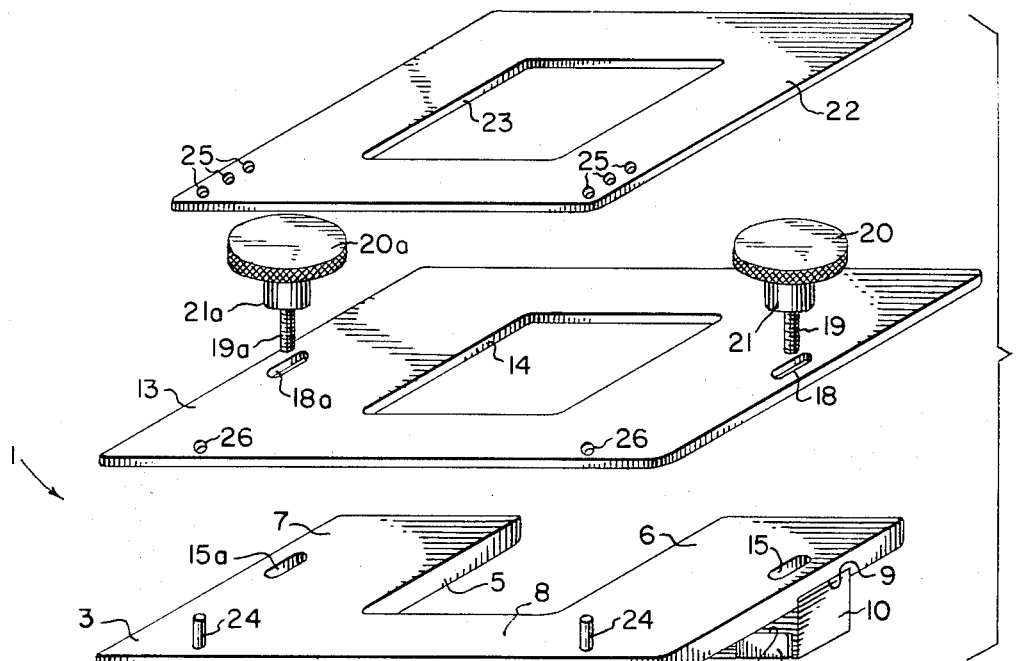
FIG. 1 is an exploded, isometric view of a routing template constructed in accordance with one embodiment of the invention.
Figure 2:
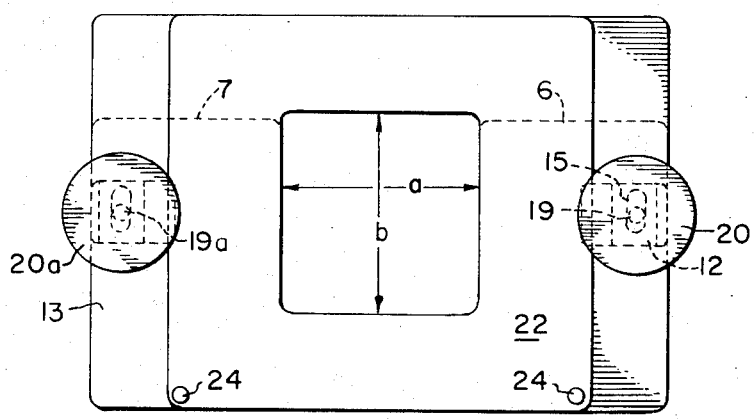
FIG. 2 is a top plan view of the template shown in FIG. 1 with the parts assembled.
Figure 3:
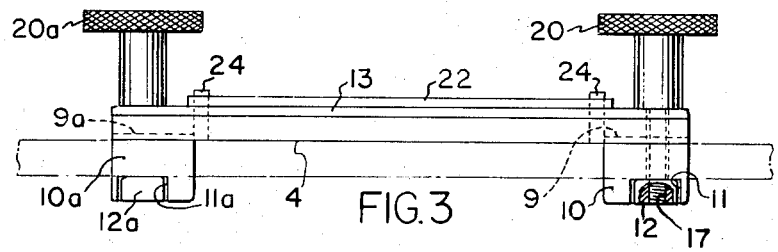
FIG. 3 is a side elevational view, partly in section, of the apparatus shown in FIG. 2.

Apparatus constructed in accordance with the embodiment shown in FIGS. 1 – 4 comprises a body 1 including a base 2 formed of metal or the like and having smooth, flat, upper and lower surfaces 3 and 4, respectively. The base has a slot or opening 5 so as to present a substantially U-shaped configuration in plan. The slot 5 extends fore and aft of the base 2 and forms a pair of parallel legs 6 and 7 joined by a web 8.

The lower surface 4 of the leg 5 has a transverse groove 9 in which is secured a block or housing 10, the lower surface of which has a groove 11 transverse to the groove 9. Slidably accommodated in the groove 11 is a clamp lug 12 for a purpose presently to be explained. The leg 7 of the base 2 includes parts identical to the parts 9 – 12 which are identified by the same reference characters, followed by the suffix a.

The body 1 also includes, preferably, a flat, plate-like wear member 13 formed of metal having a greater area than that of the base 2 and being secured to the upper surface thereof by screws or by any other conventional means (now shown). Although the wear plate 13 is preferred it is not an essential part of the body 1.

The plate 13 includes an opening 14 overlying the slot 5 and having the same width as that of the slot, but the other dimension of the opening 14 may be greater or less than the length of the slot 5. As shown, the opening 14 has a dimension a corresponding to the width of the slot 5 and a dimension b somewhat greater than the length of the slot. The size of the opening 14 may be different from that shown, but in any event, it overlies and communicates with the slot 5.

The leg 6 of the base 2 has an elongate slot 15 extending fore and aft of the leg and completely through the latter. The housing 10 has an identical slot 16 in register with the slot 15 and the lug 12 has a threaded opening 17 which underlies the slots 15 and 16. The leg 7 has parts corresponding exactly to the parts 15 – 17 and are identified by corresponding reference characters where practicable, followed by the suffix a. If the wear plate 13 is utilized as part of the body structure, it will have slots 18 and 18a which register with the slots 15 and 15a, respectively.

Figure 4:
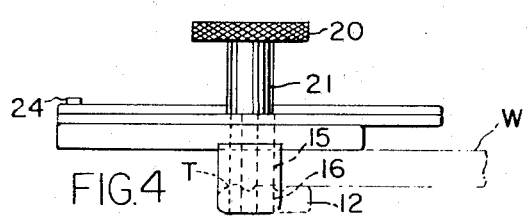
FIG. 4 is a reduced, side elevational view of the apparatus.

Means for effecting operation of the clamp lugs 12 and 12a comprises threaded bolts 19 and 19a which extend through the associated slots and are threaded into the threaded opening of the lugs 12 and 12a, respectively. Knobs 20, 20a are fixed to the bolts 19, 19a and each knob has a shouldered portion 21, 21a that is adapted to bear against the upper surface of the base 2, or against the upper surface of the plate 13 if the latter is used. By rotating the bolts 19, 19a in a direction to remove them from their clamp lugs 12, 12a, the latter may move downwardly so as to be loosened in their respective housings 10, 10a whereupon they may be slid fore and aft as shown in FIG. 4. The lugs 12 may be locked in any selected position of fore and aft adjustment by rotation of the bolts 19, 19a in such direction as to be threaded into the associated lugs. The arrangement is such that the lugs are capable of movement in two different, normal planes. Each lug also preferably includes an upstanding toe T at its upper, rear end to form a fulcrum about which the lug may rock when it is in its projected position.

The apparatus includes a flat, plate-like guide member 22 having smooth upper and lower surfaces. The fore and aft dimension of the member 22 preferably corresponds to that of the wear plate 13, but the transverse dimension of the member 22 is such as to enable it to fit between the shouldered portions 21, 21a of the clamp bolts without interference. The member 22 has an opening 23 therein having an area no greater than that of the opening 14 in the wear member 13, the opening 23 being capable of overlying and communicating with the opening 14.

The guide member 22 is adapted to be separably assembled with the other parts of the apparatus, but it is important that the member 22 be fixed against movement relative to the other parts when the template is in use. Accordingly, means for securing the member 22 is removable relation to the body 1 comprises a pair of spaced apart, upstanding dowels or positioning pins 24 anchored in the base 2 and a plurality of pairs of correspondingly spaced locating openings 25 in the member 22, the openings being of such size as snugly to accommodate the pins 24. If the wear member 13 is utilized, it of course will have pin-accommodating openings 26 corresponding to the openings 25. Depending upon which pair of openings 25 receives the pins 24, the opening 23 will occupy a selected position of adjustment relative to the opening 14.

The disclosed guide member 22 is representative of a number of similar guide members which correspond to the member 22 except for the thickness and the shape and area of the opening 23. Each of the other guide members may be substituted for the member 22 and each of the other guide members will have an opening similar to the opening 23 except for the shape and/or area.

To condition the apparatus for use in the routing of a hinge-accommodating pocket or recess in a workpiece W such as a door jamb, for example, the locking lugs 12, 12a may be loosened, dropped, and slid forwardly or rearwardly so as to accommodate one edge of the workpiece W between the lugs 12 and the lower surface of the base member 2. The template structure then may be slid along the edge of the workpiece to the desired position, whereupon the operating bolts 19, 19a may be turned to effect clamping of the workpiece between the clamp lugs and the base 2. A guide plate 22 having the desired thickness and the desired size and shape opening 23 may be positioned atop the body 1 and secured by the pins 24. The rotary cutter of a routing tool (not shown) then may be passed through the openings 23, 14 and 5 to rout the workpiece. The shape and depth of the recess formed in the workpiece will depend upon the thickness of the guide plate 22 and upon the shape of the opening in the guide plate.

The rotary cutter of most routers is surrounded by and projects beyond a shroud which engages a workpiece. The extent to which the cutter projects beyond the shroud thus determines the depth of the recess. To vary the depth of the recess, the cutter must be shifted relatively to the shroud so as to vary the extent to which it projects beyond the shroud. With apparatus constructed in accordance with the invention, such adjustment of the router's cutter is not necessary.

Figure 5:
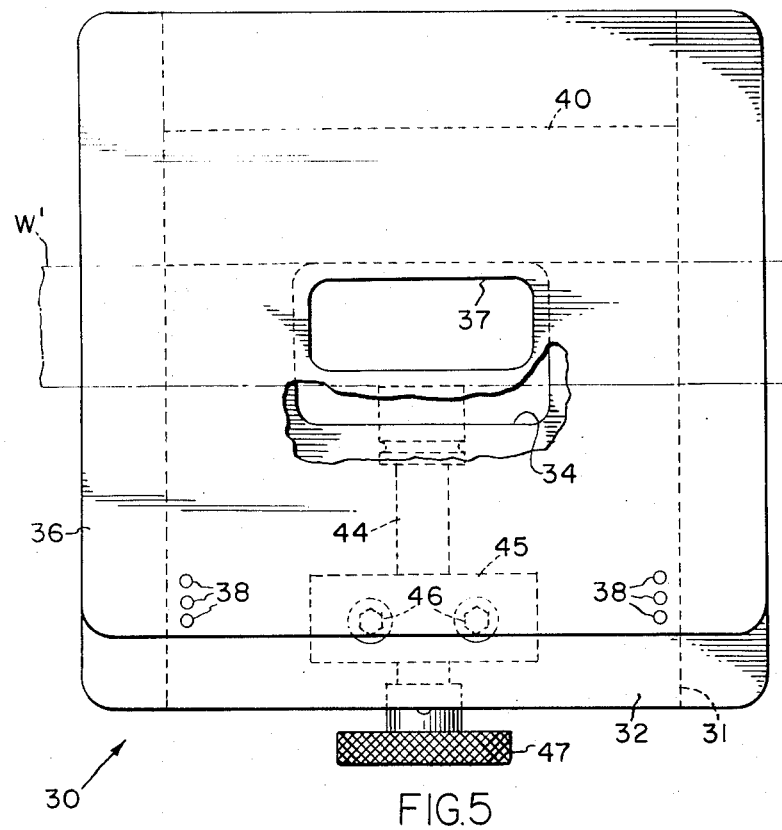
FIG. 5 is a view similar to FIG. 2 of another embodiment of the invention, with certain parts broken away for clarity of illustration.
Figure 6:
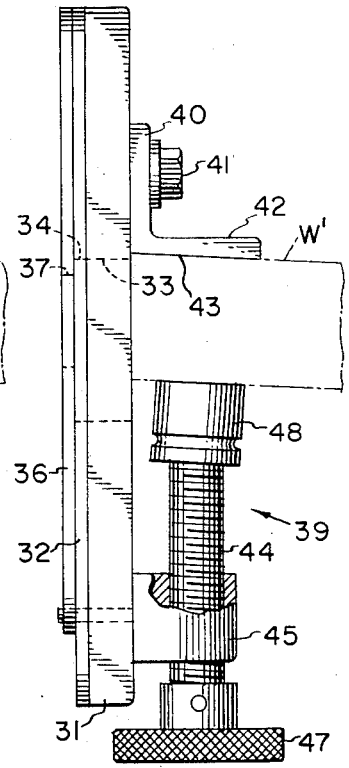
FIG. 6 is a side elevational view of the apparatus shown in FIG. 5.
Figure 7:
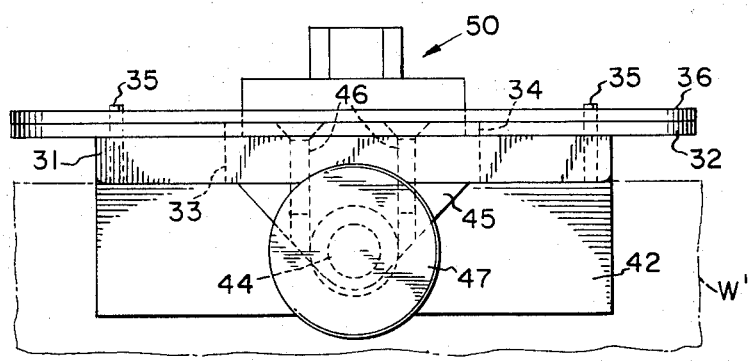
FIG. 7 is an end elevational view of the modified embodiment, and illustrating a drill guide supported by the template.

The construction shown in FIGS. 5, 6 and 7 comprises a body 20 composed of a base 31 to the upper surface of which is secured in any convenient manner a wear plate 32, it being understood that the wear plate is preferred, but not essential. The base 31 has a central, rectangular opening 33 therein and the wear plate 32 has a preferably identical opening 34 in register with the opening 33. The base 31 carries a pair of upstanding pins or dowels 35 which pass through openings formed in the wear plate 32.

A typical routing guide plate is shown at 36 and comprises a flat plate having an opening 37 which is adapted to overlie the opening 34. The opening 37 is disclosed as being rectangular and of lesser area than that of the opening 34, but it will be understood that the opening 37 can be of different configuration and of any area not greater than that of the opening 34. The guide plate 36 also is provided with a plurality of pairs of openings 38 adapted for the removable accommodation of the pins 35. Depending upon which pair of openings 38 receive the pins, the opening 37 will occupy a selected position of adjustment relative to the opening 34.

Clamping means 39 is provided for clamping the body 30 to a workpiece W' and comprises a rigid clamp member 40 secured to the lower surface of the base 31 by bolts 41 or the like and having a flange 42 which depends from the base 31 and is located adjacent the opening 33. The inner surface 43 of the flange 42 preferably is inclined, as is shown in FIG. 6. The clamp means 39 also comprises a threaded shaft 34 accommodated in a correspondingly threaded lug 45 that is fixed to the base 31 by bolts 46 or the like, the shaft 44 having an operating knob 47 fixed at one end thereof and a bearing foot 48 rockably connected to the other end thereof and confronting the flange 42.

The apparatus is particularly adapted to serve as a routing guide for routing a recess in an edge of a workpiece W' such as a door. To condition the apparatus for use, the clamping means 39 is adjusted so as to clamp the body 30 on the edge of the workpiece W' in the manner shown in FIG. 6. Should the clamped edge of the workpiece be beveled, as is conventional with one edge of a door, the inclination of the surface 43 of the clamping flange 42 will enable the edge of the workpiece to fit flush against the lower surface of the base 31, and the rockable connection of the shaft 44 to the foot 48 will enable the latter to fit flush against the workpiece.

When the body 30 has been clamped to the workpiece, the guide plate 36 may be placed in overlying relation to the body and the pins 35 fitted in a selected pair of openings 38 so as to locate the opening 37 in the desired relation relative to the edge of the workpiece. A routing tool (not shown) then may be introduced to the opening 37 so as to form a recess in the edge of the workpiece corresponding to the shape and area of the opening 37.

The guide plate 36 may be removed and replaced by any one of a number of others having a different thickness and/or a different shape and area opening 37 so as to form a recess in the workpiece to a desired depth and to a desired configuration.

When preparing a workpiece such as a door for installation in a doorway, one edge of the door normally must be bored to accommodate a latch bolt. Templates constructed according to the invention may be provided with a drill guide to facilitate the boring of a door.

Figure 8:
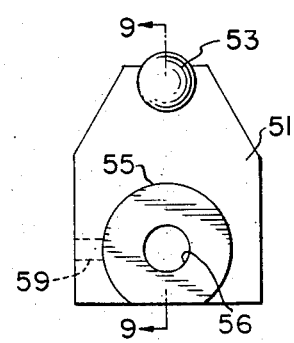
FIG. 8 is a top plan view of the drill guide.
Figure 9:
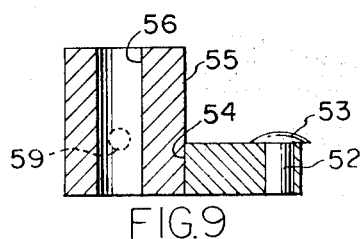
FIG. 9 is a sectional view taken on the line 9 — 9 of FIG. 8.

Illustrated in FIGS. 7 – 9 is a drill guide 50 which may be utilized with either of the disclosed template embodiments. The guide 50 comprises a body 51 of such size as to fit snugly, in a fore and aft direction, in the opening 37 or, if preferred, in the opening 34. The thickness of the body 51 corresponds to the thickness of the body 30. At the forward end of the body is a bolt or rivet 52 having a head 53 which projects beyond the end of the body. At the rear end of the body is an opening 54 in which is fitted a tubular guide 55 having an axial bore 56 therein. The guide is retained in the opening by a set screw 59.

To use the guide 50 it is fitted into the appropriate opening of the template so that the head 53 bears upon the upper surface of the template and the body 51 rests against the workpiece. A rotary drill (not shown) having a stop thereon then may be inserted into the bore 56 to drill a hole or bore in the workpiece. The stop on the drill will engage the upper end of the guide 55 when the desired depth bore has been drilled. The guide 50 is typical of many which may have bores 56 of different size to accommodate different size drills.

The disclosed embodiments are representative of presently preferred forms of the invention, but are intended to be illustrative rather than definitive thereof. The invention is defined in the claims.

We claim:

1. A template construction for use in guiding a tool in forming a recess in a workpiece, said construction comprising a base member of predetermined thickness having an opening therethrough; at least one clamp lug below the lower surface of said base; means mounting said clamp lug on said base for movement toward and away from the lower surface of said base for clamping said base member to a workpiece to be recessed with said opening overlying said workpiece; a guide plate carried by said base member in overlying relation therewith and having a smooth upper surface for supporting such tool, said guide plate having a predetermined thickness with relation to the thickness of said base member and having an opening therein registering with the opening in said base member, the opening in said guide plate corresponding in area and shape to the area and shape of the recess to be formed in such workpiece but having no part thereof extending beyond the confines of the opening in said base member; positioning measn carried by said base member; and locating means carried by said guide plate cooperable with said positioning means to secure said guide plate in a selected one of a number of adjusted positions relative to said base, whereby the opening in said guide plate may be adjusted relatively to the opening in said base member and thereby adjust the zone at which such workpiece may be recessed 2. The construction set forth in claim 1 wherein said lug is mounted by its said mounting means for fore and aft movements in directions transverse to the directions of its movements toward and away from the lower surface of said base member.

3. The construction set forth in claim 1 wherein said lug has a toe at one end thereof forming a fulcrum about which said lug may rock.

4. The construction set forth in claim 1 including a flat plate of predetermined thickness relative to the thickness of said base member and interposed between said base member and said guide plate, said flat plate having an opening therein registering with the openings in said base member and said guide plate, the area of the opening in said guide plate being no greater than the area of the opening in said flat plate.

5. The construction set forth in claim 4 including locating means carried by said flat plate and cooperable with said positioning means to secure said flat plate on said base member.

6. The construction set forth in claim 1 wherein said positioning means comprises pins projecting from the upper surface of said base member and wherein said locating means comprises openings in said guide plate for removable accommodation of said pins.

7. The construction set forth in claim 6 wherein said guide plate has more pin-accommodating openings than there are pins projecting from said base member.

* * * * *